United States Patent
Beaumont et al.

(10) Patent No.: US 6,496,203 B1
(45) Date of Patent: *Dec. 17, 2002

(54) STANDARDIZED AND APPLICATION-INDEPENDENT GRAPHICAL USER INTERFACE COMPONENTS IMPLEMENTED WITH WEB TECHNOLOGY

(75) Inventors: Christian Beaumont, Issaquah, WA (US); Gregory S Lindhorst, Woodinville, WA (US); Stephen J. Millet, Seattle, WA (US); James F. Springfield, Woodinville, WA (US); Victor A. Stone, Mercer Island, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,436

(22) Filed: May 27, 1998

(51) Int. Cl.[7] .................................................. G06F 3/14
(52) U.S. Cl. ........................ 345/762; 345/744; 345/779; 345/764; 345/765; 345/811; 345/968
(58) Field of Search ................................. 345/334, 333, 345/339, 340, 342, 346, 335, 762, 765, 764, 781, 788, 803, 744, 779; 707/501, 513; 709/203, 201, 219, 217

(56) References Cited

U.S. PATENT DOCUMENTS

| | | | |
|---|---|---|---|
| 5,287,448 A | | 2/1994 | Nicol |
| 5,625,783 A | * | 4/1997 | Ezekiel et al. ............... 345/352 |
| 5,644,739 A | * | 7/1997 | Moursund .................... 395/354 |
| 5,768,511 A | * | 6/1998 | Galvin et al. ................. 707/10 |
| 5,802,530 A | * | 9/1998 | Van Hoff ..................... 345/335 |
| 5,828,674 A | * | 10/1998 | Proskauer ..................... 714/724 |
| 5,845,299 A | * | 12/1998 | Arora et al. .................. 345/352 |
| 5,890,170 A | * | 3/1999 | Sidama ........................ 707/501 |
| 5,907,843 A | * | 5/1999 | Cleron et al. ................ 707/103 |
| 5,911,145 A | * | 6/1999 | Arora et al. ................. 707/501 |
| 5,940,075 A | * | 8/1999 | Mutschler III et al. ....... 345/335 |
| 6,157,936 A | * | 12/2000 | Mutschler, III et al. ..... 707/513 |

OTHER PUBLICATIONS

Peter Kent, Using Microsoft Internet Explorer Que Corporation pp. 62–63, 71, 84, 1995.*

* cited by examiner

Primary Examiner—Kristine Kincaid
Assistant Examiner—Thomas T. Nguyen
(74) Attorney, Agent, or Firm—Banner & Witcoff, Ltd.

(57) ABSTRACT

The present invention generates graphical user interface (GUI) components with GUI regions on a GUI display using web technology such that the GUI components are substantially independent of the host application. The host application defines a respective size and a respective location for each GUI region on the GUI display. The host application also instantiates a corresponding web browser for each GUI region. Each corresponding browser retrieves and executes an associated web page that defines the appearance and/or the functionality of a GUI region. The web page is written in a standard high-level language such as hypertext markup language such that the appearance and functionality of the GUI regions may be easy to create and modify. Because the web page defining a GUI region can be located anywhere on the world wide web, the functionality of the GUI regions is extensible beyond the capabilities of the host terminal running the host application. In addition, the corresponding browser determines an appropriate time for performing the corresponding functionality of each GUI region. The corresponding browser may also bind to an object model within the host application to provide the host application functions via a GUI region.

28 Claims, 5 Drawing Sheets

STANDARDIZED AND APPLICATION-INDEPENDENT GRAPHICAL USER INTERFACE COMPONENTS IMPLEMENTED WITH WEB TECHNOLOGY

BACKGROUND OF THE INVENTION

1. Technical Field

This invention relates to software for creating user interface components on a graphical user interface (GUI) display such as a computer screen, and more particularly, to graphical user interface (GUI) regions that are created by a host application using browsers and web pages such that the appearance and functionality of the GUI regions are substantially independent of the host application and such that the GUI regions may be created using a standardized programming language.

2. Related Information

A user of a computer, whether the computer is a PC or a workstation, has by now interacted with graphical interface components on the computer screen. For example, referring to FIG. 1, a graphical user interface (GUI) display 17 such as a computer screen commonly displays a toolbar 16 within a word processor application. The toolbar 16 of the example is comprised of GUI regions such as buttons. A GUI region is any area on the computer screen that, when interacted with by the user, provides a functionality of the application.

In the word processor application for example, the toolbar 16 has GUI regions that, when interacted with, activate macros or other common functions associated with the word processor application. Each GUI region has an identifying appearance on the toolbar and provides a corresponding functionality when that GUI region is interacted with. For example, a GUI region represented by a picture of scissors provides the functionality of "cut text selection" when clicked on. The user may interact with the GUI region, for example, by clicking on the GUI region with a mouse or staring at that GUI region for a predetermined time period or by any other means that are known to one of ordinary skill in the art.

The toolbar 16 of FIG. 1 is comprised of three GUI regions including a first GUI region 18 for "opening a text file", a second GUI region 20 for "cutting text", and a third GUI region 22 for "copying text." The prior art GUI regions, including the appearance and functionality of the GUI regions, are created by a host application code which is implemented in a programming language such as C++ or by a graphics language program such as VISUAL BASIC®. Referring to FIG. 1 for example, a host application 12, which may be a word processor application, includes a GUI component module 14 which creates the toolbar 16 of the prior art on the GUI display 17. Significantly, for the prior art toolbar 16, the code of the host application defines the appearance and functionality of the GUI regions 18, 20, and 22.

Thus, in the prior art, several disadvantages exist. First, in order to create the appearance and functionality of the GUI regions, the creator needs to be familiar with programming languages that are not high-level user-friendly standardized languages. Furthermore, the host application code typically needs to be compiled before running the host application for creating the GUI regions.

In the prior art, in order to change the appearance and functionality of the GUI regions, the host application code is rewritten with the same programming language used for the original host application code, and this host application code is recompiled into an executable code before running the host application. Such changes to the GUI regions may be desirable for upgrading the appearance and functionality of the regions. However, most users of the host application may not easily comprehend such programming languages such as C++ or VISUAL BASIC® in order to be able to modify the GUI regions. In addition, the host application code for all users desiring upgrades would need to be changed and recompiled, or alternatively, such users may be forced to repurchase an upgraded host application.

GUI components such as the toolbar 16 is comprised of at least one GUI region such as the buttons of the toolbar 16. Some host applications include a set of available GUI components or GUI regions, and the user can select which GUI components or GUI regions will appear on the GUI display. However, the appearance and functionality of each of the available GUI components and GUI regions are still determined by the host application code.

Accordingly, a need exists for allowing the appearance and functionality of GUI regions of GUI components to be created and changed without rewriting the host application code.

The present invention is described with respect to example GUI regions comprising a toolbar GUI component within a word processing host application. However, one of ordinary skill in the art should appreciate that the present invention may be practiced for any other type of GUI regions within any other type of host application from the description herein.

SUMMARY OF THE INVENTION

Accordingly to the present invention, GUI regions are generated using web technology such that the appearance and functionality of the GUI regions may be easily created and upgraded. More specifically, the present invention uses a corresponding browser and an associated web page for implementing each GUI region. In this manner, the appearance and functionality of a GUI region is created within a web page using a high-level user-friendly standardized language such as Hypertext markup language (HTML). In addition, because the web page defining the appearance and functionality of the GUI region is located within a predetermined server, that web page can be created or changed on that predetermined server in order to create or upgrade the appearance or functionality of the GUI region for all users.

With the present invention, the size and location of each of at least one GUI region on a GUI display is defined within a host application. In addition, the host application instantiates a corresponding browser that points to an associated web page defining the functionality and/or the appearance for each GUI region. Furthermore, the host application exposes a corresponding host application object to the corresponding browser for the functionality of each GUI region. The corresponding browser for a GUI region determines a respective appropriate time for the functionality of that GUI region with an event handler. The functionality for that GUI region is executed at that respective appropriate time.

The present invention can be used to particular advantage for implementing toolbars within a host application. In that case, each GUI region, that is thus implemented with web technology, is part of the toolbar provided by the host application. In addition, the present invention can be used to permit a user to define GUI parameters such as the location and size of each GUI region placed by the host application on the GUI display. The user may further specify the web page corresponding to each GUI region in building a GUI display.

In another aspect of the present invention, a web page may include an image tag for defining the appearance of the corresponding GUI region. Each web page may also include a hyperlink to at least one other web page and may include a Java applet and/or active controls that perform the functionality of the corresponding GUI region. Each web page may be written in HTML with each browser being HTML compatible. In a further aspect of the present invention, the web page for each GUI region may be located on a predetermined server accessible via the Internet. In this manner, functions associated with each GUI region can be created, modified, and stored on different computer systems.

These and other features and advantages of the present invention will be better understood by considering the following detailed description of the invention which is presented with the attached drawings.

DETAILED DESCRIPTION OF THE PREFERRED EMBODIMENTS

Figure 1:
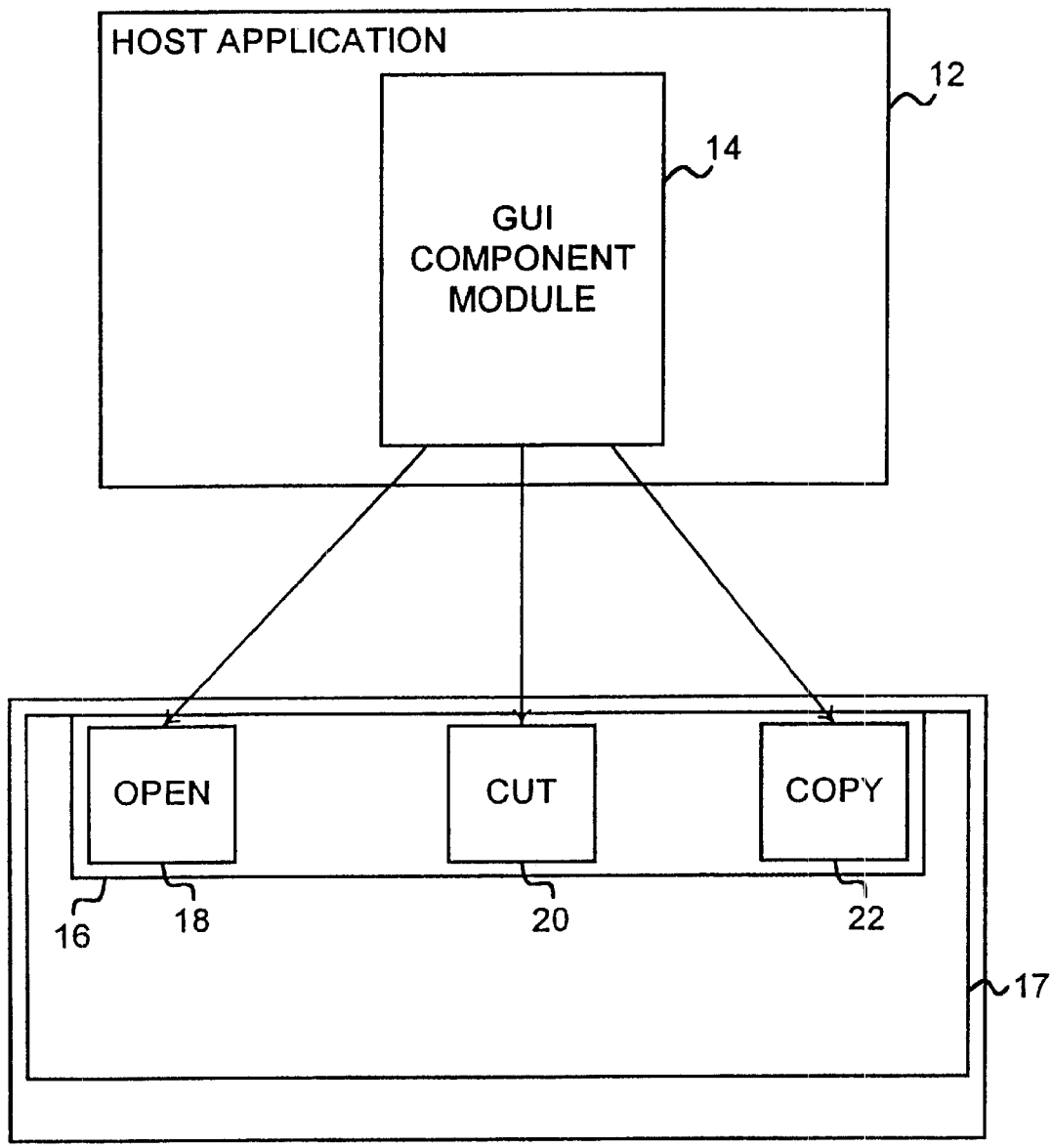
FIG. 1 shows a toolbar having GUI regions created according to the prior art.
Figure 2:
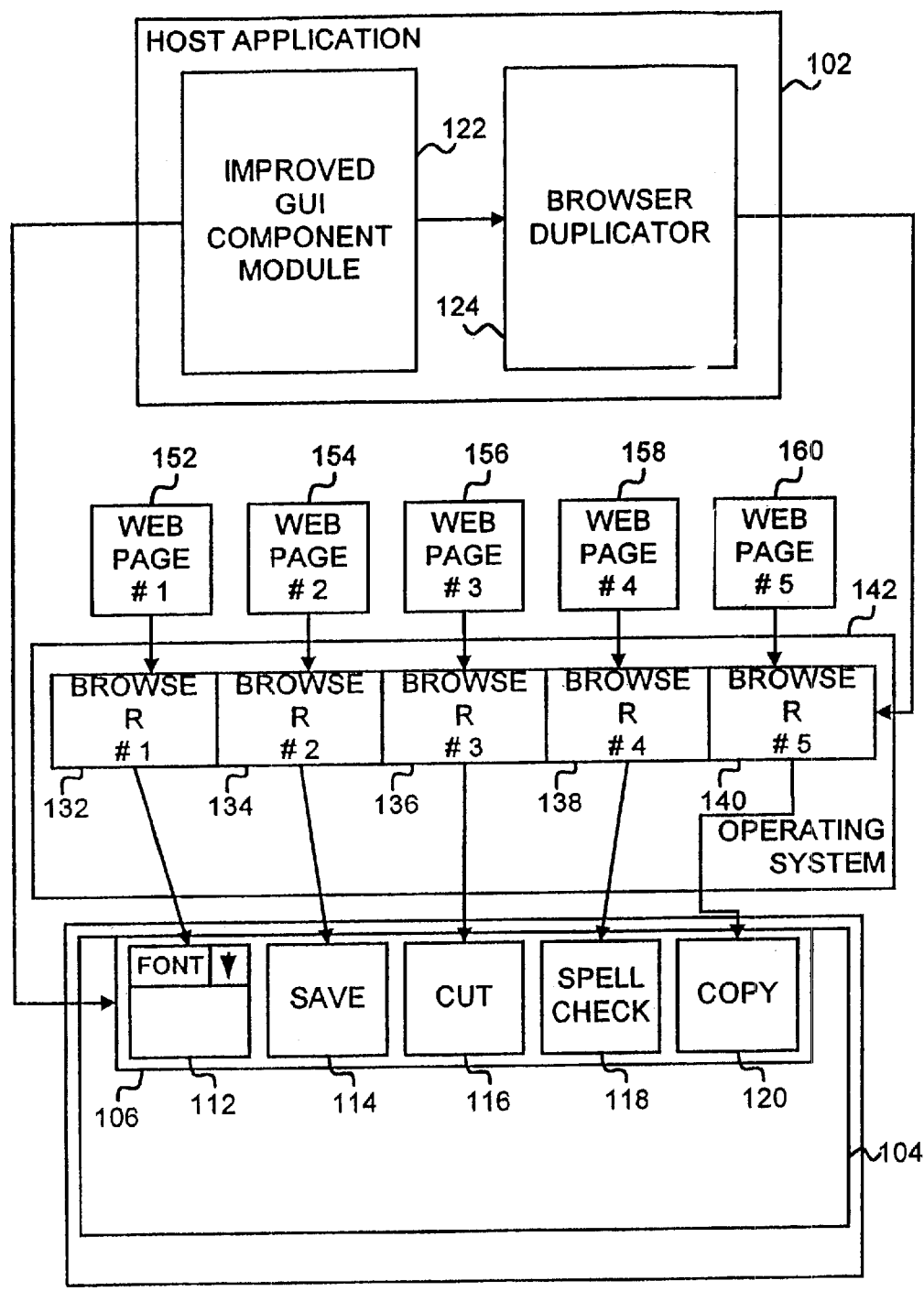
FIG. 2 shows the components for generating a toolbar, according to the present invention.

Referring to FIG. 2, a host application 102 may be any application running on a host terminal having a graphical user interface (GUI) display 104. For example, the host application may be a word processor application. The host application 102 may be written in C++, VISUAL BASIC®, or any other conventional programming language. Typically, the host application code must be compiled and linked into an executable form which can be distributed on computer readable media such as disk or CD-ROM.

The host application 102 creates GUI components on the GUI display 104. Such GUI components have identifying appearances on the GUI display 104 and provide different functions to the application. Although it should be appreciated by any one of ordinary skill in the art that the present invention can be applied to any such GUI components, the present invention will be described for the example of a toolbar GUI component within a word processor application. In this example, the toolbar GUI component consists of GUI regions 112, 114, 116, 118, and 120 on the GUI display 104.

Referring to FIG. 2, a toolbar 106 comprises a predetermined number of GUI regions with each GUI region having a corresponding functionality and an identifying appearance on the GUI display 104. For the example of a word processor application, the toolbar includes a first GUI region 112 for "selecting a text font", a second GUI region 114 for "saving a word processing file", a third GUI region 116 for "cutting text", a fourth GUI region 118 for "spell-checking", and a fifth GUI region 120 for "copying text". A GUI region may also be provided for a help function (not shown).

Although the GUI regions of FIG. 2 have the appearance with only the text "FONT", "SAVE", "CUT", "SPELL CHECK", and "COPY", the identifying appearance for each GUI region can also include other forms for identification of the GUI region's corresponding functionality. For example, a picture of scissors can be shown within the third GUI region 116 for "cutting text", or a picture of a diskette can be shown within the second GUI region 114 for "saving a word processing file".

In contrast to the prior art toolbar, the implementation of each GUI region on the toolbar 106 of FIG. 2 according to the present invention is substantially independent of the host application 102. In the present invention, the host application 102 includes an improved GUI component module 122 and a browser duplicator 124. The improved GUI component module 122 defines a toolbar having a predetermined number of GUI regions, including a respective size and a respective location of each GUI region on the GUI display 104.

This improved GUI component module 122 also instructs the browser duplicator 124 to instantiate a corresponding browser for each GUI region of the toolbar by calling a browser object model via an API (Application Programming Interface) within an operating system 142 as is known to one of ordinary skill in the art of computer systems. Each browser may be any of the various commercially available browsers such as Microsoft's Internet Explorer or Netscape's Navigator.

In the example illustration of FIG. 2, the improved GUI component module 122 defines the toolbar 106 having the five GUI regions 112, 114, 116, 118, and 120 to be located toward the top of the display 104 and to have a respective size on the display 104. With the instantiation process, an executable code for each corresponding browser is created by the host application 102 for each GUI region. Thus, a first browser 132 is instantiated for the first GUI region 112, a second browser 134 is instantiated for the second GUI region 114, a third browser 136 is instantiated for the third GUI region 116, a fourth browser 138 is instantiated for the fourth GUI region 118, and a fifth browser 140 is instantiated for the fifth GUI region 120. Each of these browsers upon instantiation has a corresponding code which executes on the operating system 142 on a host terminal running the host application 102.

Each browser retrieves and executes the code within an associated web page. The code within a web page is written in a standardized language for the Internet. For example, the code within a web page may be written in HTML, and the browsers may be HTML compatible. In the example illustration of FIG. 2, a first web page 152 corresponds to the first browser 132, a second web page 154 corresponds to the second browser 134, a third web page 156 corresponds to the third browser 136, a fourth web page 158 corresponds to the fourth browser 138, and a fifth web page 160 corresponds to the fifth browser 140.

In this manner, each GUI region of the toolbar is associated with a browser which retrieves and executes a web page for that GUI region. The contents of the web page define a corresponding functionality and/or an identifying appearance of a GUI region on the GUI display 104 when the corresponding browser executes the associated web page. For example, a web page of a GUI region may include image tags that define the identifying appearance of that GUI region. In addition, the associated web page may include Java applets that when executed carry out the functionality of that GUI region when that GUI region is interacted with. Furthermore, the associated web page may include active ACTIVEX® controls, as is known to one of ordinary skill in the art of web page design, for performing the corresponding functionality of a GUI region.

Each of the corresponding browsers includes one or more event handlers, as is known to one of ordinary skill in the art of web browser design, for determining a respective appropriate time for performing the corresponding functionality for that GUI region. For example, referring to FIG. 2, the first browser 132 includes an event handler that provides the functionality of changing text font when a user clicks on a selected font in the pull-down font menu provided in the first GUI region 112. Other example event handlers, such as automated timers, as is known to one of ordinary skill in the art of computer systems design, may be used within the browsers 132, 134, 136, 138, and 140. Such event handlers determine a respective appropriate time for performing the corresponding functionality of a GUI region.

The associated web page for a GUI region may also define the corresponding functionality for that GUI region. The associated web page defines one or both of the corresponding function and the identifying appearance of a GUI region.

Figure 3:
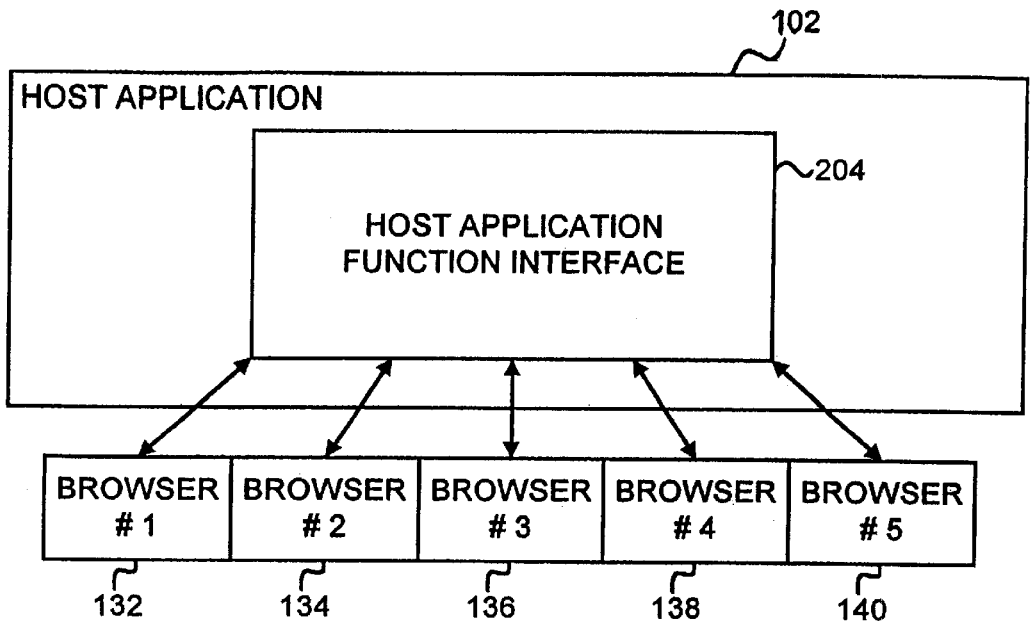
FIG. 3 shows communications between the host application and browsers for creating GUI regions, according to the present invention.

In addition, the corresponding browser may also bind to a host application object model (or to an object model within any other application program) for further carrying out the functionality of a GUI region. Referring to FIG. 3, a host application function interface 204 within the host application 102 exposes from the host application a corresponding host application object model to each of the browsers 132, 134, 136, 138, and 140 using COM (Component Object Model) technology as is known to one of ordinary skill in the art of software design.

Such communications between the browsers and the host application provides host application functionality to GUI regions. For example, if a GUI region were a "PRINT" region button, the corresponding browser for that GUI region communicates with the host application function interface 204 to bind to a "PRINT" object model within the host application 102 for carrying out the print function. An example script within the corresponding browser for binding to the "PRINT" object model of the host application is as follows:

<script language=vbscript>
sub print_on_click
host.print( )
end sub
\script>

This code within a browser includes an event handler "print-on_click" which determines that a file should be printed at an appropriate time such as when the user clicks on the "PRINT" GUI region button. Upon such an event, the host application object model "host.print( )" is called via the host application function interface 204 as illustrated in FIG. 3.

FIG. 3 shows an example of communications between the corresponding browsers 132, 134, 136, 138, and 140 and the host application 102. Alternatively, the corresponding browser for a GUI region may not communicate with the host application. In that case, the functionality of that GUI region may be determined solely by the associated web page for that GUI region.

Figure 4:
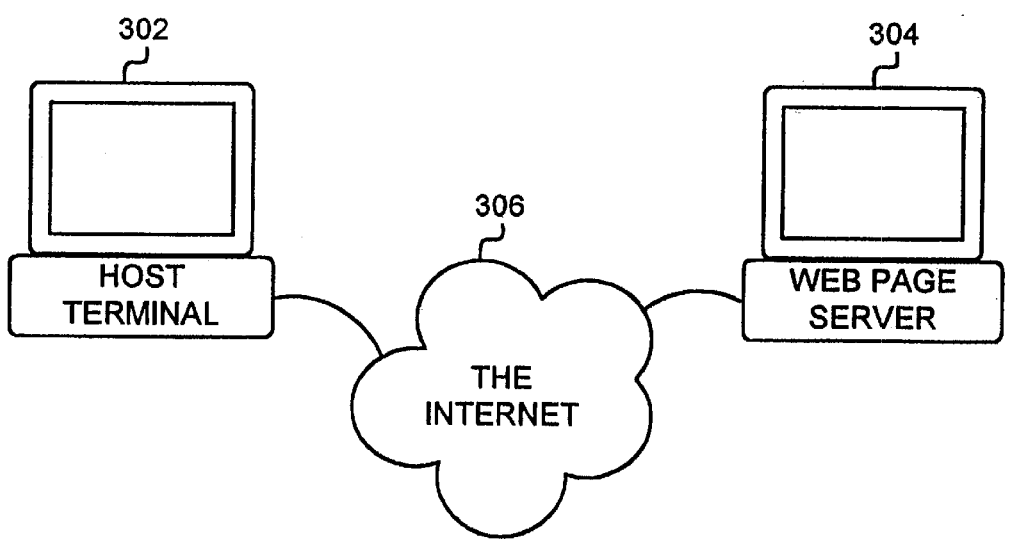
FIG. 4 shows example relative locations of the host terminal running the application having the toolbar and a web page server.

The web page corresponding to any GUI region may be located within the host terminal running the executable code of the host application. Alternatively, the web page may be located within a web page server that is remotely located from the host terminal. The browser corresponding to that web page can retrieve that web page via the Internet. Referring to FIG. 4, a host terminal 302 running the executable code of the host application and the browser for each GUI region of the tool bar is located remotely from a web page server 304 on which the web page is located. The web page that corresponds to one of the GUI regions of the toolbar may be retrieved from any client server network via the Internet 306.

Figure 5:
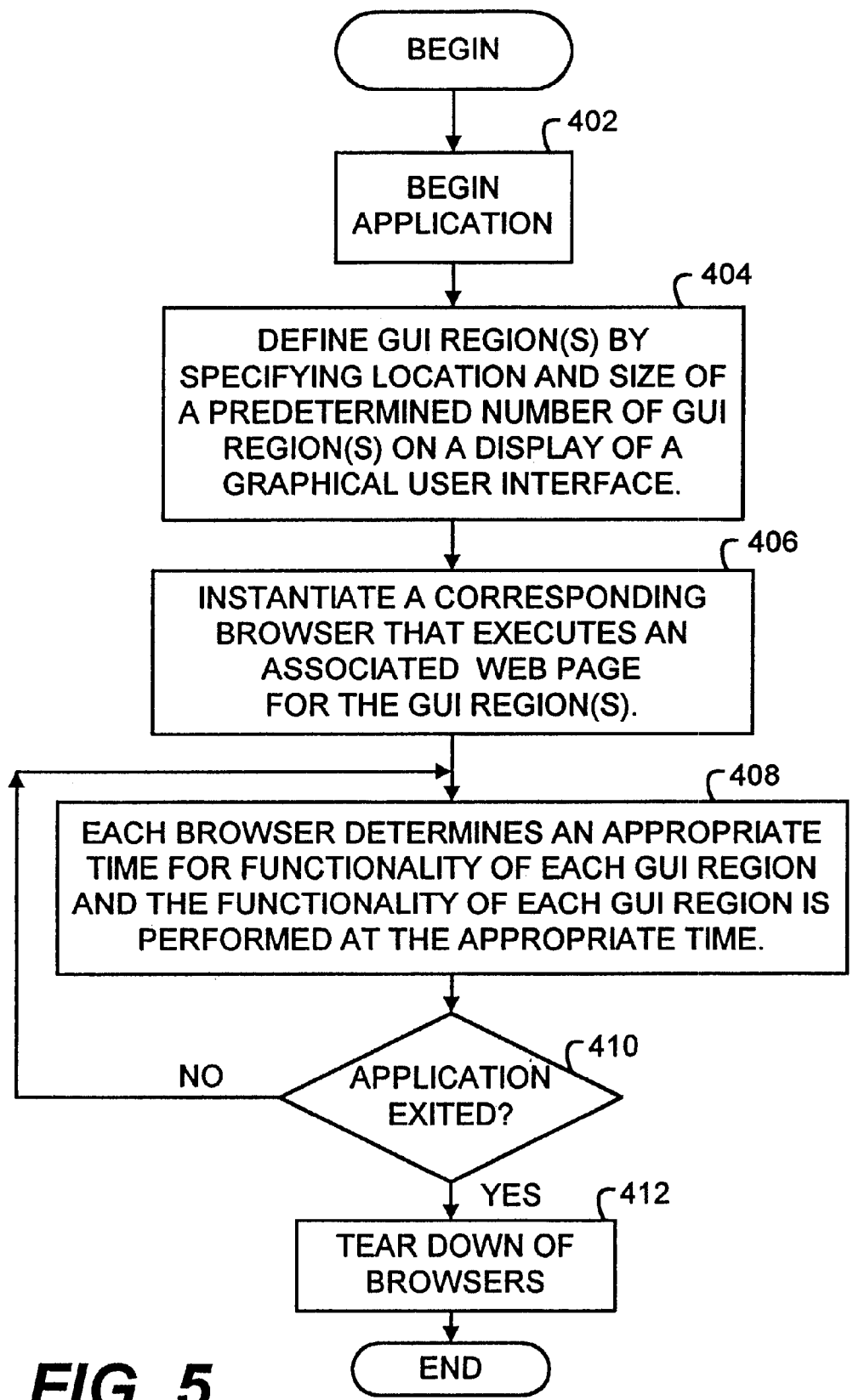
FIG. 5 shows a flowchart of the steps of operation of the components of FIGS. 2 and 3, according to the present invention.

Referring to FIG. 5, the steps of operation of the present invention for generating a toolbar within a host application is summarized with a flowchart. The host application having the toolbar begins execution at step 402. Referring to FIGS. 2 and 5, the host application 102 defines a toolbar by specifying the location and size of a predetermined number of GUI regions (at least one GUI region) on a GUI display at step 404. The host application also instantiates a corresponding browser that points to an associated web page for each GUI region of the toolbar at step 406.

Each web page when executed by the corresponding browser determines one or both of a corresponding function and an identifying appearance on the GUI display for a GUI region of the toolbar. Thus, for example, one web page may display a picture of scissors while another web page may display a hyperlink labeled "HELP."

Each browser includes event handlers for determining an appropriate time for performing the functionality of each GUI region, and the functionality is performed at the respective appropriate time for each GUI region at step 408. The functionality of a GUI region may be defined by the associated web page for that GUI region and/or by a host application object model as described herein. The functionality of the GUI regions is provided by the presence of the GUI region on the GUI display until the user exits the host application at step 410. When the user exits the host application, the browsers that were instantiated by the host application are torn down by the host application during termination of the host application at step 412. During the tear down process, any executable code associated with the browsers is deleted.

In this manner, each GUI region of the toolbar has a particular appearance, content, and functionality which is determined by an associated web page. This web page which is created using a standardized language for the Internet is independent of the host application having the toolbar. In contrast to typical programming languages such as C++ used for coding the host application, the web page is written in a user-friendly high-level standardized language such as HTML which is more widely known. Thus, the appearance, content, and functionality of the toolbar GUI regions of the present invention may be created in an easier and more standardized manner.

In addition, because appearance, content, and functionality of a toolbar GUI region resides within a web page, such attributes of the toolbar GUI region may be easily modified for an upgrade. Only the web page of a corresponding upgraded GUI region is changed using the user-friendly high-level standardized language of the web page. Furthermore, since the web page is modified, the code of the host application need not be recompiled for any upgrades to the toolbar of the present invention. With such an easy means for modifying the appearance, content, and functionality of the toolbar GUI regions, the GUI regions may be dynamic with an administrator updating the associated web page of the corresponding GUI region periodically.

Furthermore, the use of web technology for implementing the toolbar GUI regions allows for more flexibility in the creation of toolbars and other GUI components. With the browser being an instance of Internet Explorer or Netscape Navigator, for example, the functionality for any GUI region of the toolbar is not limited to the functionality available on the host terminal. The associated web page that defines a corresponding GUI region may be located anywhere on the world wide web. Moreover, the associated web page for a GUI region can further include hyperlinks to any other web page on the world wide web. For the example of the word processor application, the "spell check" GUI region may correspond to an associated web page located on a remote web page server that may provide one of the most comprehensive and sophisticated spell checkers available on the world wide web.

The foregoing is by way of example only. For example, the number of GUI regions on the toolbar of the present invention may vary. In addition, a web page of a GUI region on the toolbar may hyperlink to any number of other web pages via a hyperlinked chain of web pages. Moreover, an associated web page for a GUI region may define a plurality of subregions within that GUI region. Referring to FIG. 2 for example, the toolbar 106 may be created using one browser executing an associated web page that creates the GUI regions 112, 114, 116, 118, and 120 as subregions within the toolbar GUI region 106. Thus, generally, the toolbar within a host application may be created using any number of browsers and any number of web pages. In addition, the GUI display may be any graphical user interface as is known to one of ordinary skill in the art, aside from just the example of a computer screen.

Figure 6:
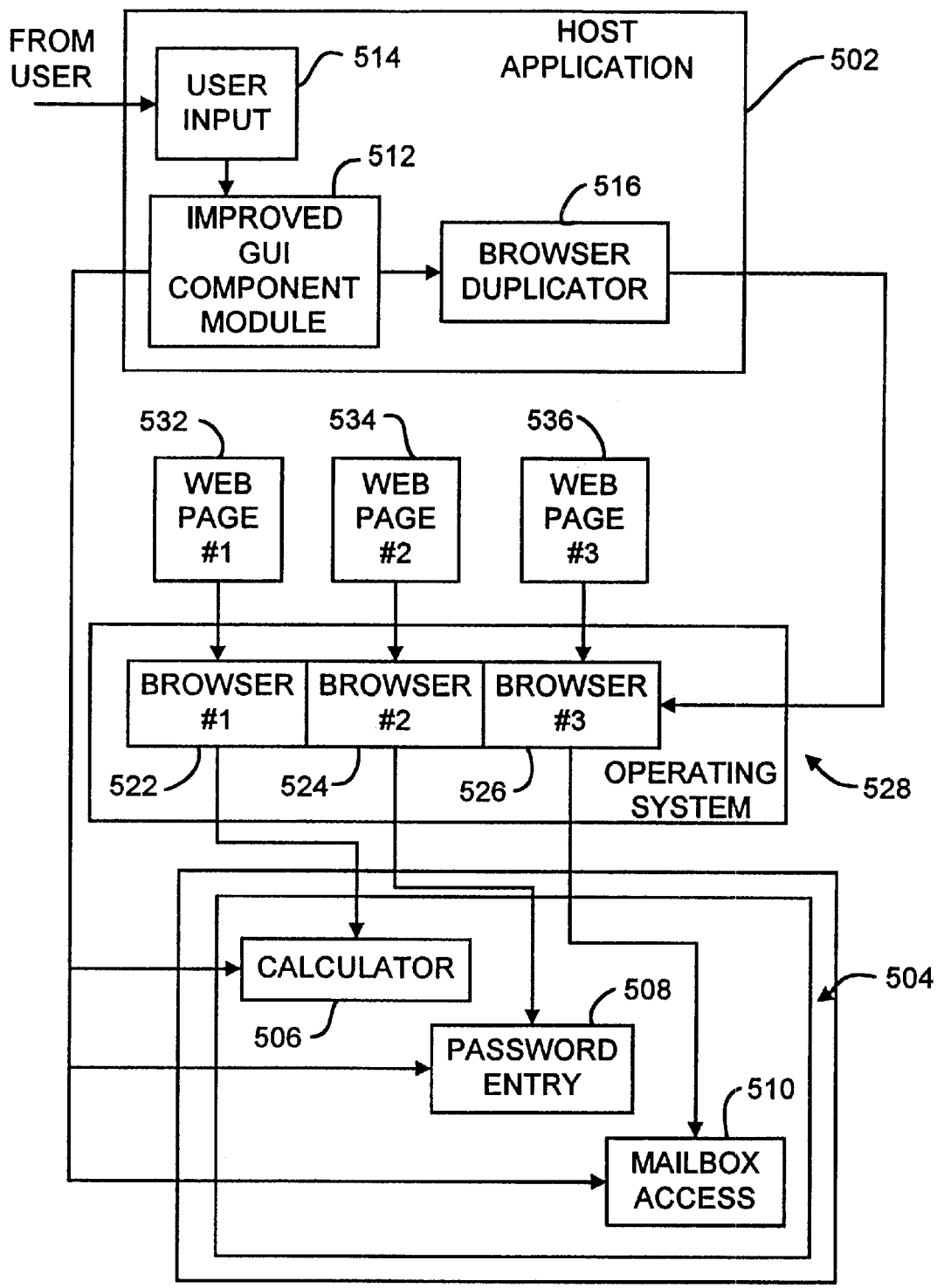
FIG. 6 shows the components for generating GUI components via another type of host application.

More importantly, the present invention is not limited to implementation of only toolbars within a word processor application. The present invention may be generalized to the use of web technology for implementing any GUI components comprised of GUI regions on a GUI display. Referring to FIG. 6, the present invention may be used for another type of application 502 that hosts any GUI components on a GUI display 504 when the GUI components are used with the application 502. Each GUI region of a GUI component has a respective size and location on the GUI display. For the example illustration of FIG. 6, a first GUI component 506 provides a "calculator" function. A second GUI component 508 provides a "password entry" function, and a third GUI component 510 provides a "mailbox access" function. Each GUI component provides a corresponding functionality and has an identifying appearance on the GUI display.

The operation of the present invention as illustrated in FIG. 6 is similar to that for creating the GUI regions of the toolbar with each toolbar GUI region being similar to a GUI component. Thus, an improved GUI component module 512 defines the size and location of each GUI component on the GUI display 504. In an alternative embodiment of the present invention, a user can input GUI component parameters via a user input 514 to determine the respective size and location of each GUI component on the GUI display. Thus, the user can control the placement of the GUI components on the GUI display.

The improved GUI component module 512 instructs a browser duplicator 516 to instantiate a corresponding browser for each GUI component. Thus a first browser 522 is instantiated for the first GUI component 506, a second browser 524 is instantiated for the second GUI component 508, and a third browser 526 is instantiated for the third GUI component 510. These browsers execute on the operating system 528 of the host application 502. Each browser retrieves and executes an associated web page corresponding to each GUI component. Thus, the first browser 522 executes a first web page 532, the second browser 524 executes a second web page 534, and the third browser 526 executes a third web page 536.

Each web page upon execution by the corresponding browser defines the functionality and appearance of a GUI component on the GUI display. The corresponding browser for each of the GUI components determines an appropriate time for performing the corresponding functionality of each GUI component. The present invention can be used to particular advantage when the user can select the associated web page for each GUI component in building the components of the graphical user interface. Additionally, the corresponding browser for any GUI component may bind to a host object of a host application to provide host application functionality via that GUI component.

In this manner, the present invention for building GUI components as illustrated in FIG. 6 has similar operations and advantages as already mentioned for the implementation of the toolbar GUI regions. The invention is limited only as defined in the following claims and equivalents thereof

What is claimed is:

1. A host application for execution on a client computer, the client computer including a browser and an operating system, the browser and the operating system being separate from the host application, the host application including a host application interface and being stored on a computer-readable medium having computer-executable instructions for performing the steps comprising:

defining within the host application a respective size and a respective location for each of at least one GUI region on a GUI display;

instantiating from the host application a corresponding browser that points to an associated web page defining a corresponding identifying appearance for each GUI region;

providing host application functionality corresponding to at least one of the at least one GUI region by calling from the corresponding browser a corresponding object exposed by the host application via the host application function interface;

determining a respective appropriate time for the corresponding functionality of each GUI region with a corresponding event handler within the corresponding browser for each GUI region;

executing the corresponding functionality at the respective appropriate time for each GUI region; and wherein at least one of the at least one GUI region includes a plurality of subregions, each subregion having at least one of an identifying appearance and a corresponding functionality defined by the associated web page of said GUI region.

2. The computer-readable medium of claim 1, wherein the corresponding event handler within the corresponding browser of said GUI region includes a means for detecting that said GUI region has been selected by a user.

3. The computer-readable medium of claim 1, wherein said at least one GUI region defines at least a portion of a toolbar provided by the host application.

4. The computer-readable medium of claim 1, having flier computer-executable instructions for performing the step of:

accepting GUI parameters input by a user for determining the respective size and the respective location for each GUI region; and accepting as input by the user a selection of the associated web page for each of the at least one GUI region.

5. In a computer system having a client computer that executes a host application and that includes a GUI display, a method for providing at least one GUI region on the GUI display, the method including the steps of:

defuxing within the host application a respective size and a respective location for each of at least one GUI region on a GUI display;

instantiating from the host application a corresponding browser that points to an associated web page defining at least one of a corresponding functionality and an identifying appearance for each GUI region;

exposing from the host application a corresponding host application object to the corresponding browser for the corresponding functionality of each of at least one GUI region;

determining a respective appropriate time for the corresponding functionality of each GUI region with a corresponding event handler within the corresponding browser for each GUI region;

executing the corresponding functionality at the respective appropriate time for each GUI region; and wherein the at least one GUI region defines at least a portion of a toolbar provided by the host application.

6. The method of claim 5, further including the step of:

accepting GUI parameters input by a user for determining the respective size and the respective location for each GUI region; and accepting as input by the user a selection of the associated web page for each of the at least one GUI region.

7. The method of claim 5, wherein the associated web page includes an image tag for defining the indenting appearance of at least one of the at least one GUI region.

8. The method of claim 5, wherein the associated web page includes a hyperlink to at least one other web page.

9. The method of claim 5, wherein the associated web page includes a Java applet that performs the corresponding functionality of at least one of the at least one GUI region.

10. The method of claim 5, wherein the associated web page includes active ACTIVEX® controls that perform the corresponding functionality of at least one of the at least one GUI region.

11. The method of claim 5, wherein the associated web page is written in hypertext markup language, and wherein the corresponding browser is hypertext markup language compatible.

12. The method of claim 5, wherein the associated web page is located on a server on the Internet different from the computer system.

13. An apparatus for generating at least one GUI region on a GUI display for a host application executed by a client workstation, the apparatus comprising:

means for defining within the host application a respective size and a respective location of each GUI region;

means for instantiating from the host application a corresponding browser that points to an associated web page defining at least one of a corresponding functionality and an identifying appearance for each GUI region;

means for exposing from the host application a corresponding host application object to the corresponding browser for the corresponding functionality of each of at least one GUI region;

means for determining a respective appropriate time for the corresponding functionality of each GUI region with a corresponding event handler within the corresponding browser for each GUI region;

means for executing the corresponding functionality at the respective appropriate time for each GUI region;

means for accepting GUI parameters input by a user for determining the respective size and the respective location for each GUI region; and means for accepting as input by the user a selection of the associated web page for each of the at least one GUI region.

14. The apparatus of claim 13, wherein at least one of the at least one GUI region defines at least a portion of a toolbar provided by the host application.

15. The apparatus of claim 13, wherein the associated web page includes an image tag for defining the identifying appearance of the corresponding GUI region.

16. The apparatus of claim 13, wherein the associated web page includes a hyperlink to at least one other web page.

17. The apparatus of claim 13, wherein the associated web page includes a Java applet that performs the associated functionality of at least one of the at least one GUI region.

18. The apparatus of claim 13, wherein the associated web page includes active ACTIVE® controls that perform the corresponding functionality of at least one of the at least one GUI region.

19. The apparatus of claim 13, wherein the associated web page is written in hypertext markup language, and wherein the corresponding browser is hypertext markup language compatible.

20. The apparatus of claim 13, wherein the associated web page is located on a server on the Internet different from the computer system.

21. A host application program for execution on a client computer, the client computer including a browser and an operating system, the browser and the operating system being separate from the application program, the host application program being stored on a computer-readable medium having computer-executable modules comprising:

a GUI component module for defining within the application program a respective size and a respective location for a plurality of GUI regions on a GUI display;

a browser duplicator module for instantiating from the host application a plurality of browsers that point to a plurality of associated web pages each defining at least one of a corresponding functionality and a corresponding identifying appearance for each GUI region of the plurality of GUI regions wherein each duplicated browser includes an event handler module for determining a respective appropriate time for performance of the functionality of the corresponding GUI region; and wherein the at least one GUI region defines at least a portion of a toolbar provided by the host application.

22. The host application program of claim 21, further comprising: a host application function interface module for providing a plurality of host application program functionalities each corresponding to one of the plurality of GUI regions by calling from the corresponding browser a corresponding object exposed by the host application program via the host application function interface.

23. The host application program of claim 21, wherein the GUI component module comprises: a computer-executable module for accepting GUI parameters input by a user for determining the respective size and the respective location for at least one of the plurality of GUI regions.

24. A host application for execution on a client computer, the client computer including a browser and an operating system, the browser and the operating system being separate from the host application, the host application including a host application interface and being stored on a computer-readable medium having computer-executable instructions for performing the steps comprising:

defining within the host application a respective size and a respective location for at least one GUI region on a GUI display;

instantiating from the host application a browser that points to at least one web page defining at least one corresponding identifying appearance for the at least one GUI region;

providing host application functionality corresponding to the at least one GUI region by calling from the browser at least one object exposed by the host application via the host application function interface;

determining within the browser a respective appropriate time to activate the corresponding functionality of each GUI region;

executing the corresponding functionality at the respective appropriate time for each GUI region; and wherein the at least one GUI region defines at least a portion of a toolbar provided by the host application.

25. The host application of claim 24 wherein the browser points to at least one web page specified by a user of the host application.

26. The host application of claim 24 wherein the step of defining within the host application the respective size and the respective location for the at least one GUI region on the GUI display further comprises defining within the host application a respective size and a respective location for a plurality of GUI regions on the GUI display.

27. The host application of claim 26, wherein the browser points to a plurality of web pages defining a plurality of corresponding identifying appearances for the plurality of GUI regions.

28. The host application of claim 27 wherein the step of providing host application functionality corresponding to the at least one GUI region by calling from the browser the at least one object exposed by the host application via the host application function interface further comprises providing host application functionality corresponding to the plurality of GUI regions by calling from the browser a plurality of objects exposed by the host application via the host application function interface.

* * * * *

UNITED STATES PATENT AND TRADEMARK OFFICE
CERTIFICATE OF CORRECTION

PATENT NO.    : 6,496,203 B1
DATED         : December 17, 2002
INVENTOR(S)   : Christian Beaumont et al.

It is certified that error appears in the above-identified patent and that said Letters Patent is hereby corrected as shown below:

<u>Column 8,</u>
Line 61, "flier" has been replaced with -- further --;

<u>Column 9,</u>
Line 5, "defuxing" has been replaced with -- defining --;
Line 31, "indenting" has been replaced with -- identifying --.

Signed and Sealed this

Sixth Day of January, 2004

JAMES E. ROGAN
*Director of the United States Patent and Trademark Office*